US012651141B2

(12) United States Patent
Tao et al.

(10) Patent No.: US 12,651,141 B2
(45) Date of Patent: Jun. 9, 2026

(54) METHOD, APPARATUS AND STORAGE MEDIUM FOR GENERATING AND APPLYING MULTILAYER NEURAL NETWORK

(71) Applicant: CANON KABUSHIKI KAISHA, Tokyo (JP)

(72) Inventors: Wei Tao, Beijing (CN); Tsewei Chen, Tokyo (JP); Dongchao Wen, Beijing (CN); Junjie Liu, Beijing (CN); Deyu Wang, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 1214 days.

(21) Appl. No.: 17/230,577

(22) Filed: Apr. 14, 2021

(65) Prior Publication Data

US 2021/0334622 A1    Oct. 28, 2021

(30) Foreign Application Priority Data

Apr. 20, 2020    (CN) .......................... 202010312882.0

(51) Int. Cl.
G06N 3/04        (2023.01)
G06N 3/08        (2023.01)
(52) U.S. Cl.
CPC ................. G06N 3/04 (2013.01); G06N 3/08 (2013.01)
(58) Field of Classification Search
CPC ........... G06N 3/04; G06N 3/08; G06N 3/045; G06N 3/063; G06N 3/0464; G06N 3/0495
See application file for complete search history.

(56) References Cited

U.S. PATENT DOCUMENTS

2019/0138882 A1*  5/2019  Choi ......................... G06N 3/08
2020/0026977 A1*  1/2020  Lee ...................... G06V 10/776
2020/0320369 A1* 10/2020  Meng ........................ G06N 3/02

OTHER PUBLICATIONS

S. Jung et al., "Learning to Quantize Deep Networks by Optimizing Quantization Intervals With Task Loss," 2019 IEEE/CVF Conference on Computer Vision and Pattern Recognition (CVPR), Long Beach, CA, USA, 2019, pp. 4345-4354 (Year: 2018).*
Jungwook Choi, et al., PACT: Parameterized Clipping Activation For Quantized Neural Networks, arXiv:1805.06085v2 [cs.CV], Jul. 17, 2018, pp. 1-15.

* cited by examiner

*Primary Examiner* — Tewodros E Mengistu
(74) *Attorney, Agent, or Firm* — Canon U.S.A., Inc. IP Division

(57)        ABSTRACT

A method for generating a multilayer neural network including acquiring a multilayer neural network, wherein the multilayer neural network includes at least convolutional layers and quantization layers; generating, for each of the quantization layers in the multilayer neural network, quantization threshold parameters based on a quantization bit parameter and a learnable quantization interval parameter in the quantization layer; and updating the multilayer neural network to obtain a fixed-point neural network based on the generated quantization threshold parameters and operation parameters for each layer in the multilayer neural network.

16 Claims, 10 Drawing Sheets

400

S420

QUANTIZATION    BIT    PARAMETER    AND    LEARNABLE
QUANTIZATION  INTERVAL  PARAMETER

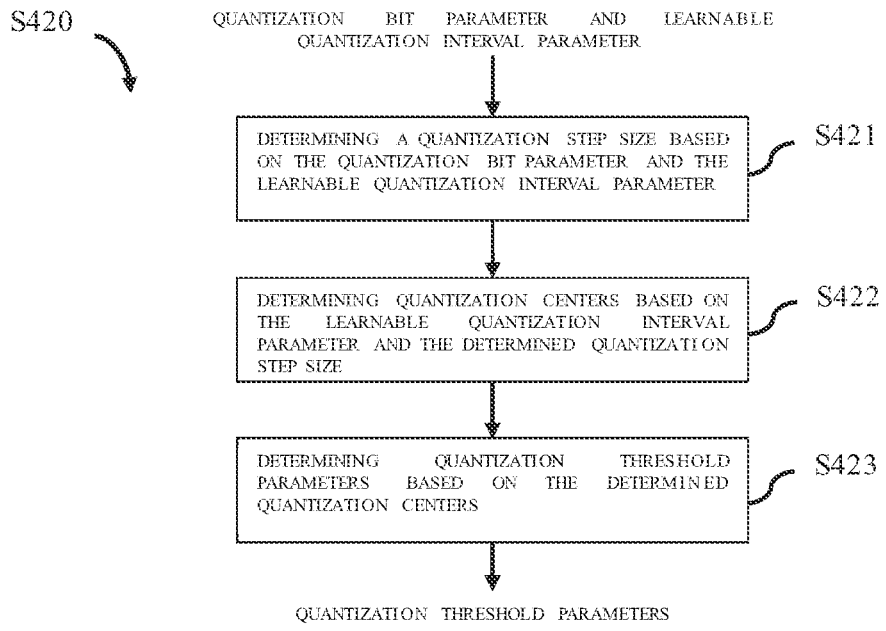

DETERMINING  A  QUANTIZATION  STEP  SIZE  BASED
ON  THE  QUANTIZATION  BIT  PARAMETER  AND  THE
LEARNABLE  QUANTIZATION  INTERVAL  PARAMETER          S421

DETERMINING  QUANTIZATION  CENTERS  BASED  ON
THE        LEARNABLE        QUANTIZATION        INTERVAL
PARAMETER  AND  THE  DETERMINED  QUANTIZATION
STEP  SIZE          S422

DETERMINING        QUANTIZATION        THRESHOLD
PARAMETERS        BASED        ON        THE        DETERMINED
QUANTIZATION  CENTERS          S423

QUANTIZATION  THRESHOLD  PARAMETERS

FIG.5

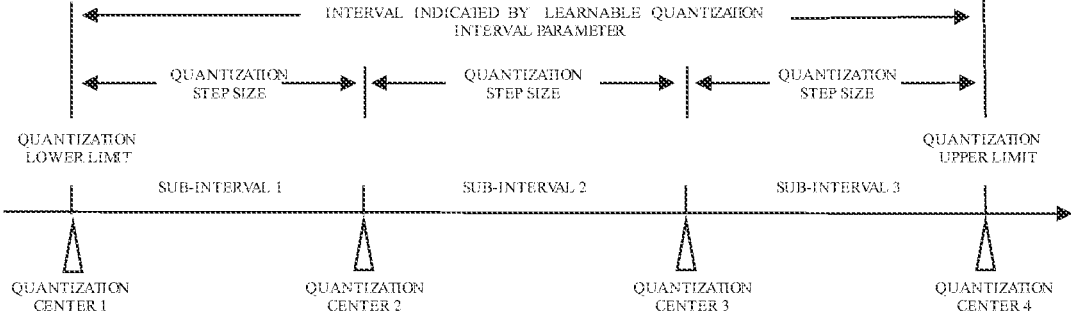

INTERVAL  INDICATED  BY  LEARNABLE  QUANTIZATION
INTERVAL  PARAMETER

QUANTIZATION            QUANTIZATION            QUANTIZATION
STEP SIZE                  STEP SIZE                  STEP SIZE

QUANTIZATION                                                            QUANTIZATION
LOWER LIMIT                                                            UPPER LIMIT

SUB-INTERVAL 1          SUB-INTERVAL 2          SUB-INTERVAL 3

QUANTIZATION          QUANTIZATION          QUANTIZATION          QUANTIZATION
CENTER 1                  CENTER 2                  CENTER 3                  CENTER 4

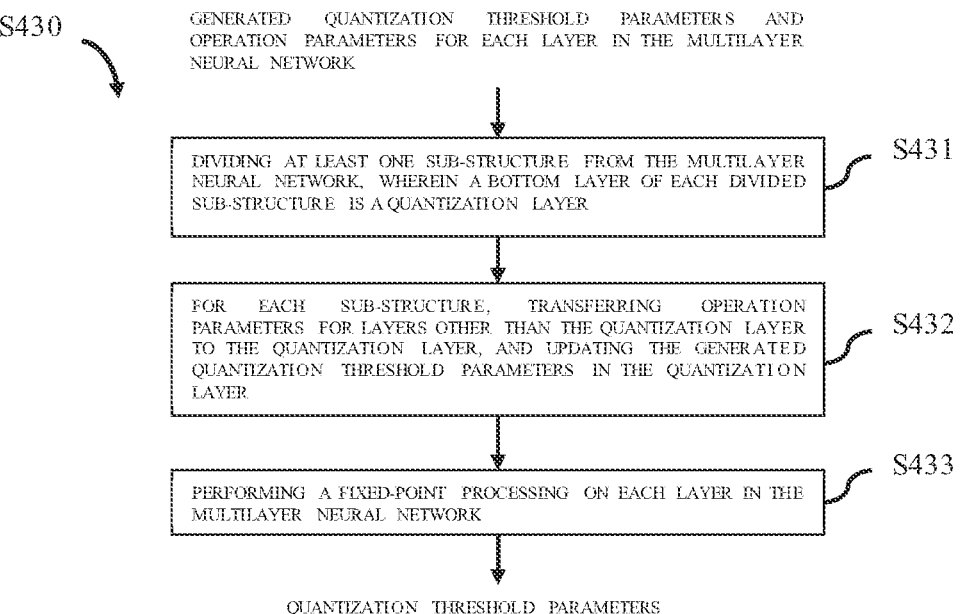

GENERATED QUANTIZATION THRESHOLD PARAMETERS AND OPERATION PARAMETERS FOR EACH LAYER IN THE MULTILAYER NEURAL NETWORK

DIVIDING AT LEAST ONE SUB-STRUCTURE FROM THE MULTILAYER NEURAL NETWORK, WHEREIN A BOTTOM LAYER OF EACH DIVIDED SUB-STRUCTURE IS A QUANTIZATION LAYER    S431

FOR EACH SUB-STRUCTURE, TRANSFERRING OPERATION PARAMETERS FOR LAYERS OTHER THAN THE QUANTIZATION LAYER TO THE QUANTIZATION LAYER, AND UPDATING THE GENERATED QUANTIZATION THRESHOLD PARAMETERS IN THE QUANTIZATION LAYER    S432

PERFORMING A FIXED-POINT PROCESSING ON EACH LAYER IN THE MULTILAYER NEURAL NETWORK    S433

QUANTIZATION THRESHOLD PARAMETERS

FIG.8

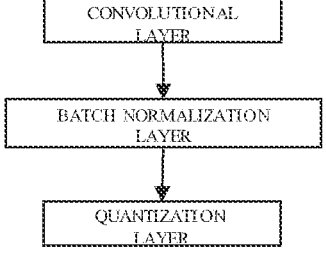

CONVOLUTIONAL LAYER

BATCH NORMALIZATION LAYER

QUANTIZATION LAYER

FIG.9A

METHOD, APPARATUS AND STORAGE MEDIUM FOR GENERATING AND APPLYING MULTILAYER NEURAL NETWORK

CROSS-REFERENCE TO RELATED APPLICATION

This application claims the benefit of Chinese Patent Application No. 202010312882.0, filed Apr. 20, 2020, which is hereby incorporated by reference in its entirety.

TECHNICAL FIELD

The present disclosure relates to a field of modeling for a multilayer neural network, and in particular to a method, an apparatus and a storage medium for generating and applying a multilayer neural network for saving processor resources.

BACKGROUND

In the field of artificial intelligence (AI), a network architecture based on Deep Learning is one of the most widely used architectures at present. The network architecture based on Deep Learning is actually a multilayer neural network structure, for example, the Convolutional Neural Network (CNN) is a most commonly used multilayer neural network presently. In the technical fields of computer vision, computer auditory and natural language processing, the convolutional neural network has been widely used. However, in presently existing multilayer neural network, its operation will cause a large amount of memory overhead and occupy a large number of processor resources. Although a better data processing result can be achieved when the multilayer neural network is operated on a GPU-based workstation or server, reducing processor resources occupied when the network is operated is still one of the goals of improving network performance Therefore, for embedded devices with limited processor resources (such as smart phones, tablet computers, etc.), the multilayer neural network can hardly be operated on the embedded devices. In order to apply the multilayer neural network in the embedded devices and enable the embedded devices to achieve more efficient operations, it is usually necessary to use a fixed-point operation to convert floating-point parameters for each layer in the multilayer neural network into fixed-point parameters to adapt to the operation requirements for the embedding devices. However, since the fixed-point operation is a lossy operation, performing the fixed-point operation layer by layer in the multilayer neural network will bring cumulative errors to the entire system, resulting in a significant deterioration in the system performance.

In order to solve the above issues, a quantized neural network is widely used in the embedded devices. In general, a quantization method for a quantization layer in the quantized neural network involves two types: one is to directly compare the data to be quantized with a predefined quantization threshold parameter; the other is to quantize the data to be quantized into a numerical space expressed by k bits based on a learnable quantization interval parameter, where the learnable quantization interval parameter consists of, for example, a quantization upper limit and a quantization lower limit. For example, the non-patent literature "PACT: Parameterized Clipping Activation for Quantized Neural Networks" (Jungwook Choi, Zhuo Wang, Swagath Venkataramani, Pierce I-Jen Chuang, Vijayalakshmi Srinivasan, Kailash Gopalakrishnan; IBM Research AI, Yorktown Heights, N.Y. 10598, USA; arXiv: 1805.06085v2 [cs.CV] 17 Jul. 2018) proposes an exemplary method for training learnable quantization interval parameters in quantization layers. The main operation thereof is: assigning a learnable activation upper limit parameter for each quantization layer, and limiting activation values to an interval [0, learnable upper limit parameter] by using a truncated RELU (Rectified Linear Unit) function; in the quantization stage, linearly quantizing the activation values in the interval [0, learnable upper limit parameter] as k bits; wherein, the learnable activation upper limit parameter is a variable in the loss function value.

Therefore, on the one hand, in a case where a quantized neural network employs predefined quantization threshold parameters as quantization layer parameters, a joint fixed-point technology can be applied to convert the quantized neural network into a fixed-point neural network more suitable for hardware, thereby reducing computation overheads of embedded devices at runtime. However, since the quantization threshold parameters are predefined, which means that the quantization layer has requirements for the distribution of its input data, for example, the Half-Wave Gaussian Quantizer (HWGQ) requires that the quantization layer input data must conform to a standard normal distribution. This requirement for input data limits the generalization capability of the neural network and also limits the overall performance of the neural network. On the other hand, in a case where a quantized neural network employs learnable quantization interval parameters as quantization layer parameters, the system performance is greatly improved compared with the employment of predefined quantization threshold parameters. However, since the quantization process itself still involves a lot of floating-point operations, the computation overheads when the network is operated cannot be reduced.

SUMMARY

In view of the recitations in the above background, the present disclosure is intended to solve at least one of the above issues.

According to one aspect of the present disclosure, a method for generating a multilayer neural network is provided, and the method comprises: acquiring a multilayer neural network, wherein the multilayer neural network includes at least convolutional layers and quantization layers; generating, for each of the quantization layers in the multilayer neural network, quantization threshold parameters based on a quantization bit parameter and a learnable quantization interval parameter in the quantization layer; and updating the multilayer neural network to obtain a fixed-point neural network based on the generated quantization threshold parameters and operation parameters for each layer in the multilayer neural network.

According to another aspect of the present disclosure, an apparatus for generating a multilayer neural network is provided, and the apparatus comprises: an acquisition unit configured to acquire a multilayer neural network, wherein the multilayer neural network includes at least convolutional layers and quantization layers; a generation unit configured to, for each of the quantization layers in the multilayer neural network, generate quantization threshold parameters based on a quantization bit parameter and a learnable quantization interval parameter in the quantization layer; and an updating unit configured to update the multilayer neural network to obtain a fixed-point neural network based on the generated quantization threshold parameters and operation parameters for each layer in the multilayer neural network.

According to yet another aspect of the present disclosure, a method for applying a multilayer neural network is provided, the method comprises: saving a loaded multilayer neural network; inputting a data set corresponding to requirements for a task that the saved multilayer neural network can perform to the saved multilayer neural network; and performing a convolution operation and a quantization operation on the data set in the multilayer neural network from top to bottom and outputting a result. Here, in the saving step, the saved multilayer neural network is a multilayer neural network generated via the above method for generating a multilayer neural network.

According to yet another aspect of the present disclosure, an apparatus for generating a multilayer neural network is provided, and the apparatus comprises: a saving unit configured to save a loaded multilayer neural network; an input unit configured to input a data set corresponding to requirements for a task that the saved multilayer neural network can perform to the saved multilayer neural network; and an operation unit configured to perform a convolution operation and a quantization operation on the data set in the multilayer neural network from top to bottom and outputting a result.

According to yet another aspect of the present disclosure, a non-transitory computer-readable storage medium is provided for storing instructions, which when executed by a processor, enable to generate a multilayer neural network, the instructions comprise: an acquisition step of acquiring a multilayer neural network, wherein the multilayer neural network includes at least convolutional layers and quantization layers; a generation step of, for each of the quantization layers in the multilayer neural network, generating quantization threshold parameters based on a quantization bit parameter and a learnable quantization interval parameter in the quantization layer; and an updating step of updating the multilayer neural network to obtain a fixed-point neural network based on the generated quantization threshold parameters and operation parameters for each layer in the multilayer neural network.

According to yet another aspect of the present disclosure, a non-transitory computer-readable storage medium is provided for storing instructions, which when executed by a processor, enable to apply a multilayer neural network, the instructions comprise: a saving step configured to save a multilayer neural network; an inputting step configured to input a data set corresponding to requirements for a task that the saved multilayer neural network can perform to the saved multilayer neural network; and an operating step configured to perform a convolution operation and a quantization operation on the data set in the multilayer neural network from top to bottom and output a result.

In the present disclosure, wherein generating of the quantization threshold parameters comprises: determining a quantization step size based on the quantization bit parameter and the learnable quantization interval parameter; determining quantization centers based on the learnable quantization interval parameter and the determined quantization step size; and determining the quantization threshold parameters based on the determined quantization centers; wherein the quantization bit parameter is determined based on the number of bits required to quantize a feature map.

In the present disclosure, wherein the updating of the multilayer neural network comprises: dividing at least one sub-structure from the multilayer neural network, wherein bottom layers of the divided sub-structures are quantization layers; transferring, for each of the divided sub-structures, the operation parameters for layers other than the quantization layer to the quantization layer, and updating the generated quantization threshold parameters in the quantization layer based on the transferred operation parameters; and performing a fixed-point processing on each layer of in the multilayer neural network, thereby converting floating-point operation parameters into fixed-point parameters.

As described above, it can be learned that, in the present disclosure, since the quantization threshold parameters in each quantization layer are generated based on the number of quantization bits and the learnable quantization interval parameter, the quantization threshold parameters in each quantization layer are not predefined, in other words, the quantization threshold parameters generated according to the present disclosure are learnable, and therefore each quantization layer has no restriction on the distribution of the input data. As a result, the overall performance (for example, accuracy) of the multilayer neural network obtained according to the present disclosure will be improved. Furthermore, in the present disclosure, when the quantization operation is performed on the data to be quantized, a simple numerical comparison operation can be performed according to the generated quantization threshold parameters, thereby the overall calculation cost of the multilayer neural network can be reduced.

Further features and advantages of the present disclosure will become apparent from the following illustration of typical embodiments with reference to the accompanying drawings.

BRIEF DESCRIPTION OF THE DRAWINGS

The drawings incorporated in and constituting a part of the specification exemplify embodiments of the present disclosure, and together with the description of the embodiments, serve to explain the principle of the present disclosure.

FIG. 5 is a flowchart schematically showing a generation step S420 as shown in FIG. 4 according to an embodiment of the present disclosure.

FIG. 6 schematically shows an example of each sub-interval and each quantization center obtained via step S422 as shown in FIG. 5.

FIG. 8 is a flowchart schematically showing an updating step S430 as shown in FIG. 4 according to an embodiment of the present disclosure.

FIGS. 9A-9D schematically show examples of four sub-structures.

DETAILED DESCRIPTION

Figure 1:
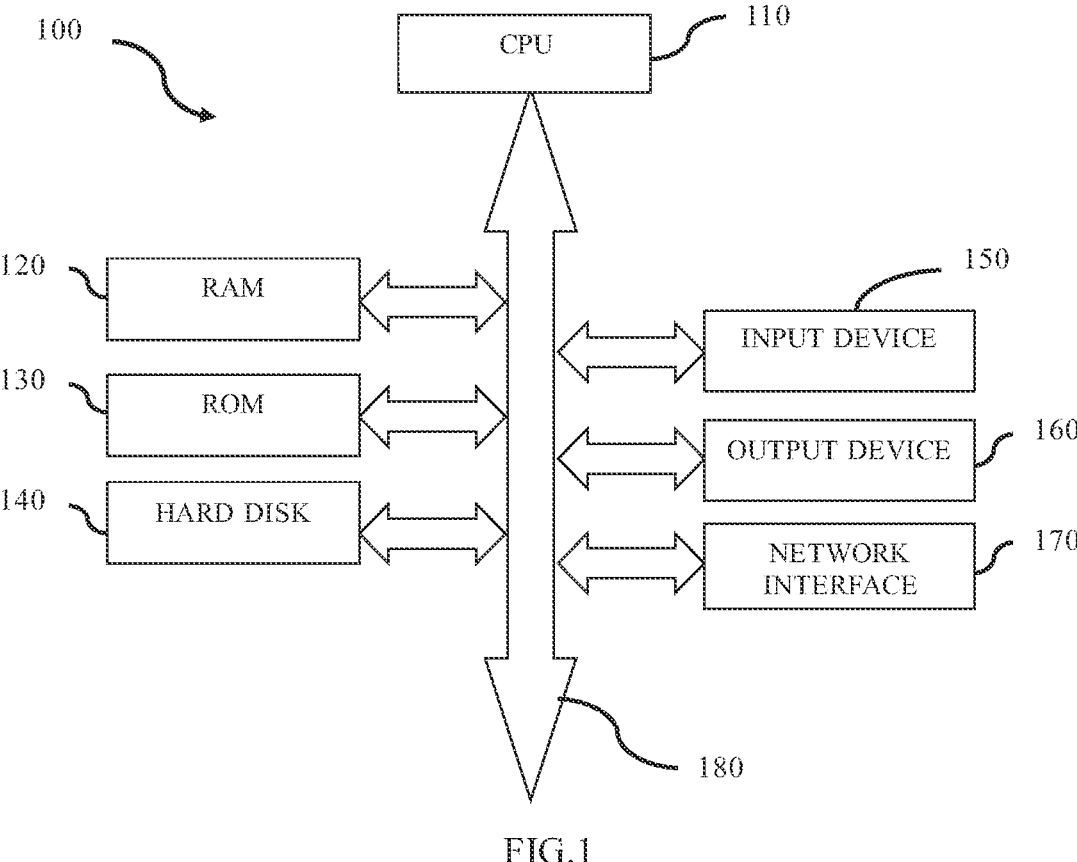
FIG. 1 is a block diagram schematically showing a hardware configuration that can implement the technology according to an embodiment of the present disclosure.

Exemplary embodiments of the present disclosure will be described below in detail with reference to the accompanying drawings. It should be noted that the following description is essentially illustrative and exemplary only, and is not intended to limit the present disclosure and application or usage thereof in any way. Unless specifically stated otherwise, the relative arrangement of components and steps, numerical expressions and numerical values that are set forth in the embodiments do not limit the scope of the present disclosure. In addition, the technologies, methods, and devices known to those skilled in the art may not be discussed in detail, but they should be part of this specification in appropriate situations.

Note that similar reference numerals and letters refer to similar items in the drawings, there once an item is defined in a drawing, it does not have to be discussed in the subsequent drawings. The present disclosure will be described in detail below with reference to the accompanying drawings.

(Hardware Configuration)

First, a hardware configuration that can implement the technology described below will be described with reference to FIG. 1.

The hardware configuration 100 includes, for example, a central processing unit (CPU) 110, a random access memory (RAM) 120, a read only memory (ROM) 130, a hard disk 140, an input device 150, an output device 160, a network interface 170, and a system bus 180. In one implementation, the hardware configuration 100 may be implemented by a computer, such as a tablet, a laptop, a desktop PC, or other suitable electronic devices. In another implementation, the hardware configuration 100 may be implemented by an embedded device, such as a digital camera, a video camera, a web camera, or other suitable electronic devices.

Figure 2:
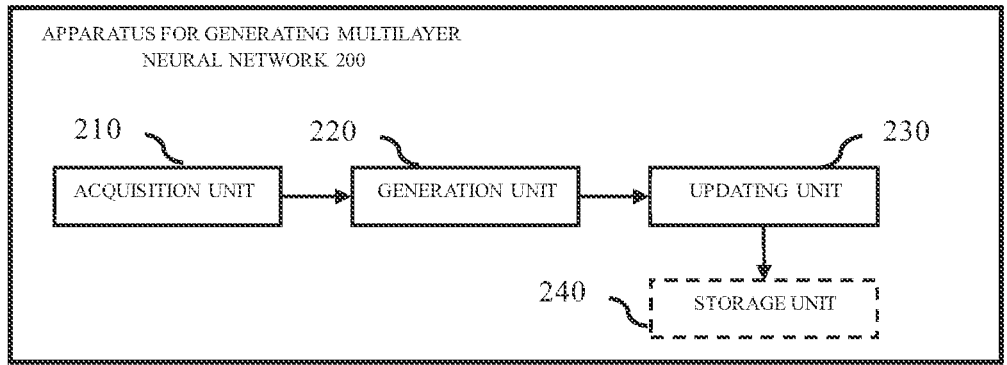
FIG. 2 is a block diagram schematically showing a configuration of an apparatus for generating a multilayer neural network according to an embodiment of the present disclosure.
Figure 4:
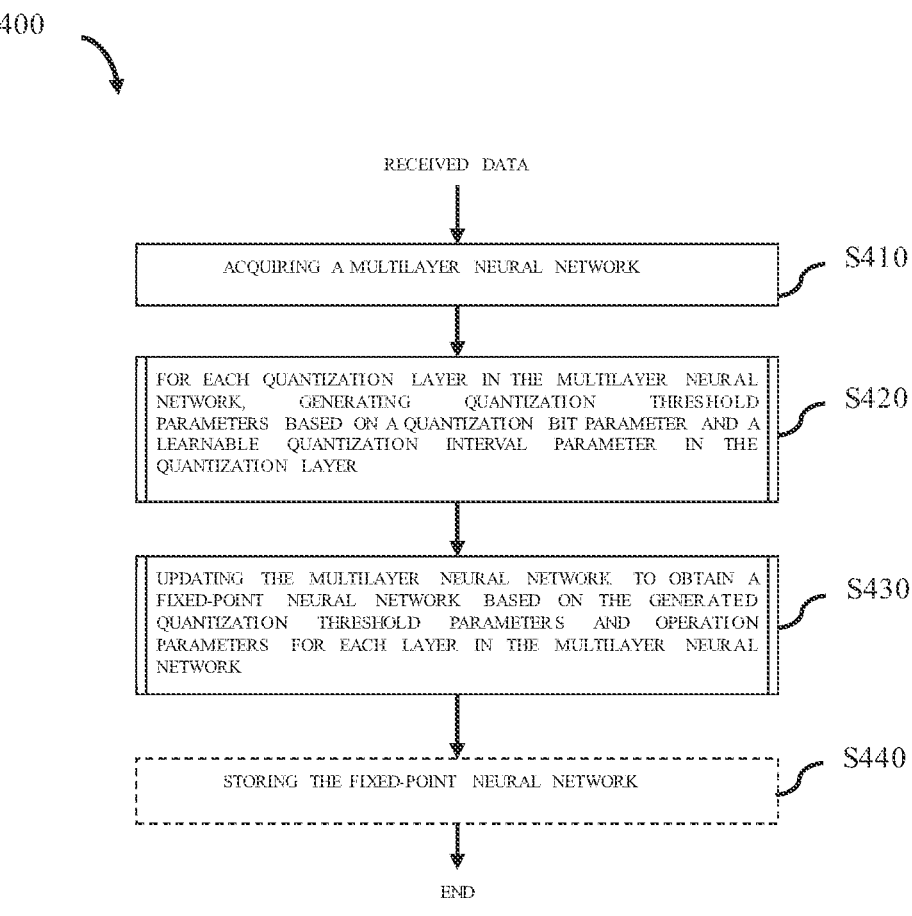
FIG. 4 is a flowchart schematically showing a method for generating a multilayer neural network according to an embodiment of the present disclosure.

In one implementation, the apparatus for generating a multilayer neural network according to the present disclosure is configured by hardware or firmware and used as a module or a component of the hardware configuration 100. For example, the apparatus 200 for generating a multilayer neural network, which will be described in detail below with reference to FIG. 2, is used as a module or a component of the hardware configuration 100. In another implementation, the methods for generating and applying a multilayer neural network according to the present disclosure are configured by software stored in the ROM 130 or the hard disk 140 and executed by the CPU 110. For example, the process 400, which will be described in detail below with reference to FIG. 4, is used as a program stored in the ROM 130 or the hard disk 140.

The CPU 110 is any suitable programmable control device (such as a processor), and can perform various functions to be described below by executing various application programs stored in the ROM 130 or the hard disk 140 (such as a memory). The RAM 120 is used to temporarily store programs or data loaded from the ROM 130 or the hard disk 140, and is also used as a space in which the CPU 110 performs various processes (such as, carries out the technology which will be described in detail below with reference to FIGS. 4, 5, and 8) and other available functions. The hard disk 140 stores various information such as an operating system (OS), various applications, control programs, a multilayer neural network, and predefined data (for example, thresholds (THs)), etc.

In one implementation, the input device 150 is used to allow a user to interact with the hardware configuration 100. In one instance, a user may input, for example, data used to acquire a multilayer neural network, information for a specific task processing (for example, a human face detection task), etc., through the input device 150. In another instance, a user can trigger a corresponding processing in the present disclosure through the input device 150. In addition, the input device 150 may take various forms, such as a button, a keyboard, or a touch screen.

In one implementation, the output device 160 is used to store the finally obtained multilayer neural network into, for example, the hard disk 140 or used to output the finally obtained multilayer neural network to a specific task processing such as a human face detection, etc.

The network interface 170 provides an interface for connecting the hardware configuration 100 to a network. For example, the hardware configuration 100 may perform data communication with other electronic devices connected via a network via the network interface 170. Optionally, a wireless interface may be provided for the hardware configuration 100 for wireless data communication. The system bus 180 may provide a data transmission path for mutual data transmission among the CPU 110, the RAM 120, the ROM 130, the hard disk 140, the input device 150, the output device 160, the network interface 170, and the like. Although referred to as a bus, the system bus 180 is not limited to any specific data transmission technology.

The above hardware configuration 100 is illustrative only, and is not intended to limit the present disclosure, its application or usage in any way. Moreover, for simplicity, only one hardware configuration is shown in FIG. 1. However, multiple hardware configurations can be used as needed.

(Apparatus and Method for Generating Multilayer Neural Network)

Next, the generation of a multilayer neural network according to the present disclosure will be described with reference to FIGS. 2 to 10B.

FIG. 2 is a configuration block diagram schematically showing an apparatus 200 for generating a multilayer neural network according to an embodiment of the present disclosure. Here, some or all of the modules shown in FIG. 2 can be implemented by dedicated hardware. As shown in FIG. 2, the apparatus 200 includes an acquisition unit 210, a generation unit 220 and an updating unit 230. Furthermore, the apparatus 200 may further include a storage unit 240.

First, for example, the input device 150 shown in FIG. 1 receives data (for example, a training set, annotation data, etc.) used to obtain a multilayer neural network, and defined data for a structure of a desired multilayer neural network according to a specific task processing, etc., which are input by the user. Next, the input device 150 transmits the received data to the apparatus 200 via the system bus 180.

Then, as shown in FIG. 2, the acquisition unit 210 acquires (i.e., generates) a multilayer neural network according to the received data, wherein the multilayer neural network includes at least convolutional layers and quantization layers. Here, the convolutional layers contain at least learnable weight parameters, and the quantization layers contain at least learnable quantization interval parameters. As an example, the multilayer neural network acquired via the acquisition unit 210 is, for example, the Alexnet binary quantized neural network shown in FIG. 3. However, obviously it is not limited to this. Taking the neural network shown in FIG. 3 as an example, the neural network has the following two characteristics.

Characteristic 1: Binarizing Weight Parameters (Weights).

According to the sign (positive or negative) of a weight parameter, 1 bit is used to represent the weight parameter, wherein, for a weight parameter with a positive value, it is represented by +1 after being binarized, and for a weight parameter with a negative value, it is represented by −1 after being binarized. Further, in order to make the convolution operation result of the binarized weight parameters and a input feature map input to the convolutional layer approximate to the convolution operation result of full-precision weight parameters and the input feature map input to the convolutional layer, in each convolution filter, there may contain a scaling coefficient α, which is used to improve the accuracy of the result of the operation using the binarized weight parameters, that is, the products of the binarized weight parameters and α are used to approximate to the full-precision weight parameters. The scaling coefficient α can be calculated according to the following formula (1).

$$\alpha = \frac{|W|_{l1}}{n} \tag{1}$$

Here, $|W|_{l1}$ represents a L1 norm corresponding to the filter in a case of full-precision weight parameters; n represents the number of weight parameters for the filter.

Based on the above formula (1), the following formula (2) can be used to express the convolution operation based on the binarized weight parameters.

$$Y = (W_b \otimes X) * \alpha + \text{bias} \tag{2}$$

Here, $W_b$ represents a convolution filter when binary weight parameters are adopted; α represents a scaling coefficient for the convolution filter when binary weight parameters are adopted; $\otimes$ represents a convolution operation; bias represents a bias parameter for the convolution operation; X represents an input feature map input to the convolutional layer (that is, the output from the layer above the convolutional layer); Y represents an output from the convolutional layer.

Characteristic 2: Quantizing Input Feature Maps (Feature-Maps) Using Multiple Bits.

In the quantization layer, according to learnable quantization interval parameters, each element in the input feature map from the layer above the quantization layer can be quantized (mapped) into a numerical space expressed by k bits, wherein the value of k is a positive integer, the choice of the value of k depends on performance requirements for a task (for example, the operation accuracy requirements for a multilayer neural network). For example, assuming that the learnable quantization interval parameter learned by the quantization layer is [0,α], the quantization layer can adopt a quantization strategy in the following formula (3).

$$Y_q = \text{round}\left(Y * \frac{2^k - 1}{\alpha}\right) * \left(\frac{\alpha}{2^k - 1}\right) \tag{3}$$

Here, Y represents data to be quantized, round $$\left(Y * \frac{2^k - 1}{\alpha}\right)$$

represents a quantization interval corresponding to Y after rounding, $$\frac{\alpha}{2^k - 1}$$

represents a quantization step size, and $Y_q$ represents a quantization result.

Returning to FIG. 2, after the acquisition unit 210 acquires the multilayer neural network, for each quantization layer in the multilayer neural network, the generation unit 220 generates quantization threshold parameters based on a quantization bit parameter and the learnable quantization interval parameter in the quantization layer. Here, the quantization bit parameter is determined based on the number of bits required to quantize the feature map. Here, the number of bits is determined by the desired accuracy of the multilayer neural network.

After generating the respective quantization threshold parameters for each quantization layer, the updating unit 230 updates the multilayer neural network to obtain a fixed-point neural network based on the generated quantization threshold parameters and operation parameters for each layer in the multilayer neural network. The fixed-point operation involved therein may be, for example, a general fixed-point technology (such as, Q-value fixed-point, etc.).

In addition, the storage unit 240 may store the fixed-point neural network obtained by the updating unit 230 so that the fixed-point neural network can be used for a subsequent specific task processing such as a human face detection, etc.

The flowchart 400 of the method shown in FIG. 4 is a process corresponding to the apparatus 200 shown in FIG. 2. As shown in FIG. 4, in the acquisition step S410, the acquisition unit 210 acquires (i.e., generates) a multilayer neural network according to the received data, wherein the multilayer neural network includes at least convolutional layers and quantization layers. As described above, as an example, the acquired multilayer neural network is, for example, the Alexnet binary quantized neural network shown in FIG. 3. However, obviously it is not limited to this.

In the generation step S420, for each quantization layer in the acquired multilayer neural network, the generation unit 220 generates quantization threshold parameters based on the quantization bit parameter and the learnable quantization interval parameter in the quantization layer. For a quantization layer in the multilayer neural network, in one implementation, in the generation step S420 shown in FIG. 4, the generation unit 220 performs respective generation operations with reference to FIG. 5.

As shown in FIG. 5, in step S421, the generation unit 220 determines a quantization step size based on the quantization bit parameter and the learnable quantization interval parameter in the quantization layer. Here, the quantization bit parameter is determined based on the number of bits required to quantize the feature map, and the number of bits is determined by the desired accuracy of the multilayer neural network. Here, the learnable quantization interval parameter generally consists of a quantization upper limit and a quantization lower limit. All values exceeding the quantization upper limit are cropped to the quantization upper limit, and all values below the quantization lower limit are cropped to the quantization lower limit. The length of the entire quantization interval can be determined according to requirements for the specific task processing. In one implementation, the determined quantization step size is, for example, a quotient between the length indicated by the learnable quantization interval parameter and the number of different output states indicated by the quantization bit parameter. As an example, the quantization step size can be obtained by a calculation of the following formula (4), for example.

$$\text{quantization step size} = \left(\frac{\text{quantization upper limit} - \text{quantization lower limit}}{2^{k-1}}\right) \tag{4}$$

Here, $2^k-1$ represents the number of different output states indicated by the quantization bit parameter, and k represents the quantization bit parameter.

In step S422, the generation unit 220 determines quantization centers based on the learnable quantization interval parameter and the determined quantization step size. In one implementation, for example, as shown in FIG. 6, taking the quantization bit parameter k=2 as an example, the generation unit 220 determines the quantization centers in the following manner:

1) Based on the quantization step size determined in step S421, the interval indicated by the learnable quantization interval parameter is divided into $2^k-1$ sub-intervals at equal spacings. For example, in a case of k=2, three sub-intervals can be obtained by the division, that is, the sub-interval 1, the sub-interval 2 and the sub-interval 3 as shown in FIG. 6.

2) The endpoint values of each sub-interval are used as the quantization centers, wherein the value of each quantization center corresponds to an actual quantized output value (which will be described in step S423). For example, in a case of k=2, four quantization centers can be obtained, that is, the quantization center 1, the quantization center 2, the quantization center 3, and the quantization center 4 as shown in FIG. 6.

Figure 7A:
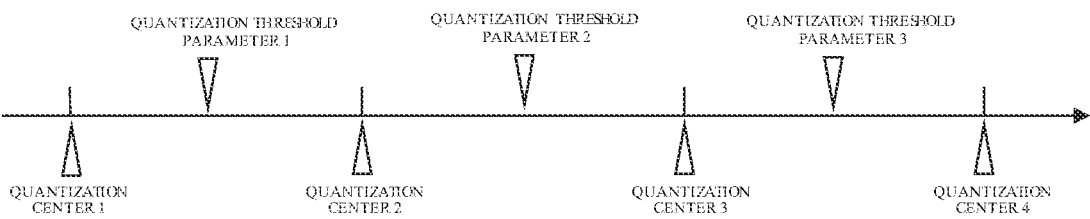
FIGS. 7A-7B schematically show an example of each quantization threshold obtained via step S423 as shown in FIG. 5.

In step S423, the generation unit 220 determines the quantization threshold parameters based on the determined quantization centers. In one implementation, the generation unit 220 uses values each of which is an average value of the values of two adjacent quantization centers as the quantization threshold parameters. For example, as shown in FIG. 7A, where the quantization bit parameter k is still 2, three quantization threshold parameters can be obtained, that is, the quantization threshold parameter 1, the quantization threshold parameter 2, and the quantization threshold parameter 3 as shown in FIG. 7A, wherein each quantization threshold parameter can be obtained by a calculation of following formula (5), for example.

quantization threshold parameter 1 (thres1)=(value of quantization center 1+value of quantization center 2)/2 quantization threshold parameter 2 (thres2)=(value of quantization center 2+value of quantization center 3)/2 quantization threshold parameter 3 (thres3)=(value of quantization center 3+value of quantization center 4)/2 (5)

As described in step S422, the value of each quantization center corresponds to an actual quantized output value. In this case, the quantized output value Y can be expressed by the following formula (6), for example.

$$Y(X) = \begin{cases} \text{value of quantization center 1,} & X \le thres1 \\ \text{value of quantization center 2,} & thres1 < X \le thres2 \\ \text{value of quantization center 3,} & thres2 < X \le thres3 \\ \text{value of quantization center 4,} & X > thres3 \end{cases} \tag{6}$$

Here, X represents an input to the quantization layer, and Y(X) represents a quantized output value corresponding to the input X.

In addition, in a case where the value of the quantization center 1 is 0 and the quantization step size is indicated by β, the above formula (6) can be expressed as the following formula (7):

$$Y(X) = \begin{cases} 0, & X \le thres1 \\ \beta, & thres1 < X \le thres2 \\ 2\beta, & thres2 < X \le thres3 \\ 3\beta, & X > thres3. \end{cases} \tag{7}$$

Figure 7B:
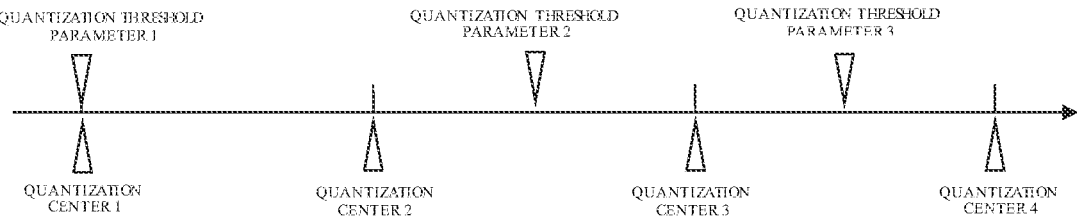

As shown in FIG. 7A, when the quantization center 1 is close to or equal to 0, the value in the interval (quantization center 1, quantization threshold parameter 1) will be quantized to a value close to or equal to 0, resulting in partial information loss. In this case, a non-uniform quantization strategy can be adopted, that is, the quantization threshold parameter 1 coincides with the quantization center 1. Therefore, in another implementation, the generation unit 220 uses the value of the first quantization center as one quantization threshold parameter, and uses values each of which is an average value of the values of two adjacent quantization centers among the remaining quantization centers as other quantization threshold parameters. For example, as shown in FIG. 7B, where the quantization bit parameter k is still 2, three quantization threshold parameters can be obtained, that is, the quantization threshold parameter 1, the quantization threshold parameter 2, and the quantization threshold parameter 3 as shown in FIG. 7B, wherein each quantization threshold parameter can be obtained by a calculation of the following formula (8), for example. In addition, in this case, the quantized output value Y can still be expressed by the above formula (6) or (7).

quantization threshold parameter 1 (thres1)=value of quantization center 1 quantization threshold parameter 2 (thres2)=(value of quantization center 2+value of quantization center 3)/2 quantization threshold parameter 3 (thres3)=(value of quantization center 3+value of quantization center 4)/2 (8)

Returning to FIG. 4, after the corresponding quantization threshold parameters are generated for each quantization layer in the multilayer neural network, in the updating step S430, the updating unit 230 updates the multilayer neural network to obtain a fixed-point neural network based on the generated quantization threshold parameters and operation parameters for each layer in the multilayer neural network. As described above, the fixed-point operation involved therein may be, for example, a general fixed-point technology (such as, Q-value fixed-point, etc.). In order to save the storage space for the multilayer neural network and make it possible to operate a multilayer neural network in embedded devices, in one implementation, in the updating step S430 shown in FIG. 4, the updating unit 230 performs respective updating operations with reference to FIG. 8.

As shown in FIG. 8, in the sub-structure division step S431, the updating unit 230 divides at least one sub-structure from the multilayer neural network acquired via the acquisition step S410, wherein the bottom layer of the divided sub-structure is a quantization layer. Preferably, in a case that the multilayer neural network acquired via the acquisition step S410 is a convolutional neural network, each sub-structure may also include a convolutional layer in order to enable the convolution operation to be reflected in the divided sub-structure. More preferably, in order to better reflect the convolution operation, the top layer of each sub-structure is a convolutional layer, and the bottom layer thereof is a quantization layer. There may be other layers between the convolutional layer and the quantization layer, such as a batch normalization layer, a pooling layer, and a scaling layer. Of course, there may be no other layers between the convolutional layer and the quantization layer, that is, there are only the convolutional layer and the quantization layer in sequence in the sub-structure. FIGS. 9A to 9D illustrate schematic diagrams of four sub-structures, however, in the scheme of the embodiment of the present disclosure, the forms of the sub-structures are not limited to the structures shown in FIGS. 9A to 9D, and the sub-structures that meet the above conditions can be divided according to the actual structure of the multilayer neural network. In the following, taking the Alexnet binary quantized neural network shown in FIG. 3 as an example, the divided sub-structures in the sub-structure division step S431 will be specifically described.

Figure 3:
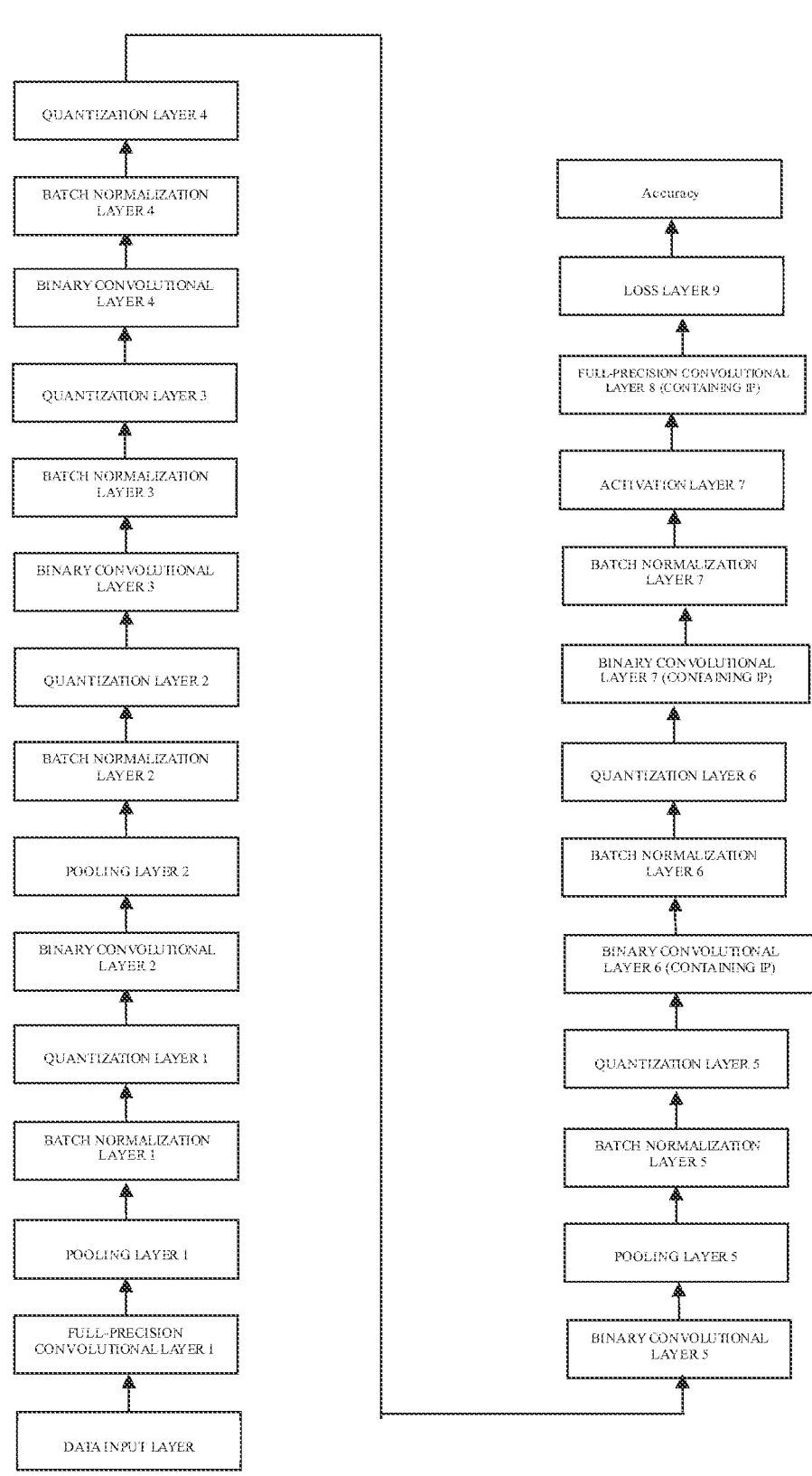
FIG. 3 schematically shows an example of a multilayer neural network.
Figure 10A:
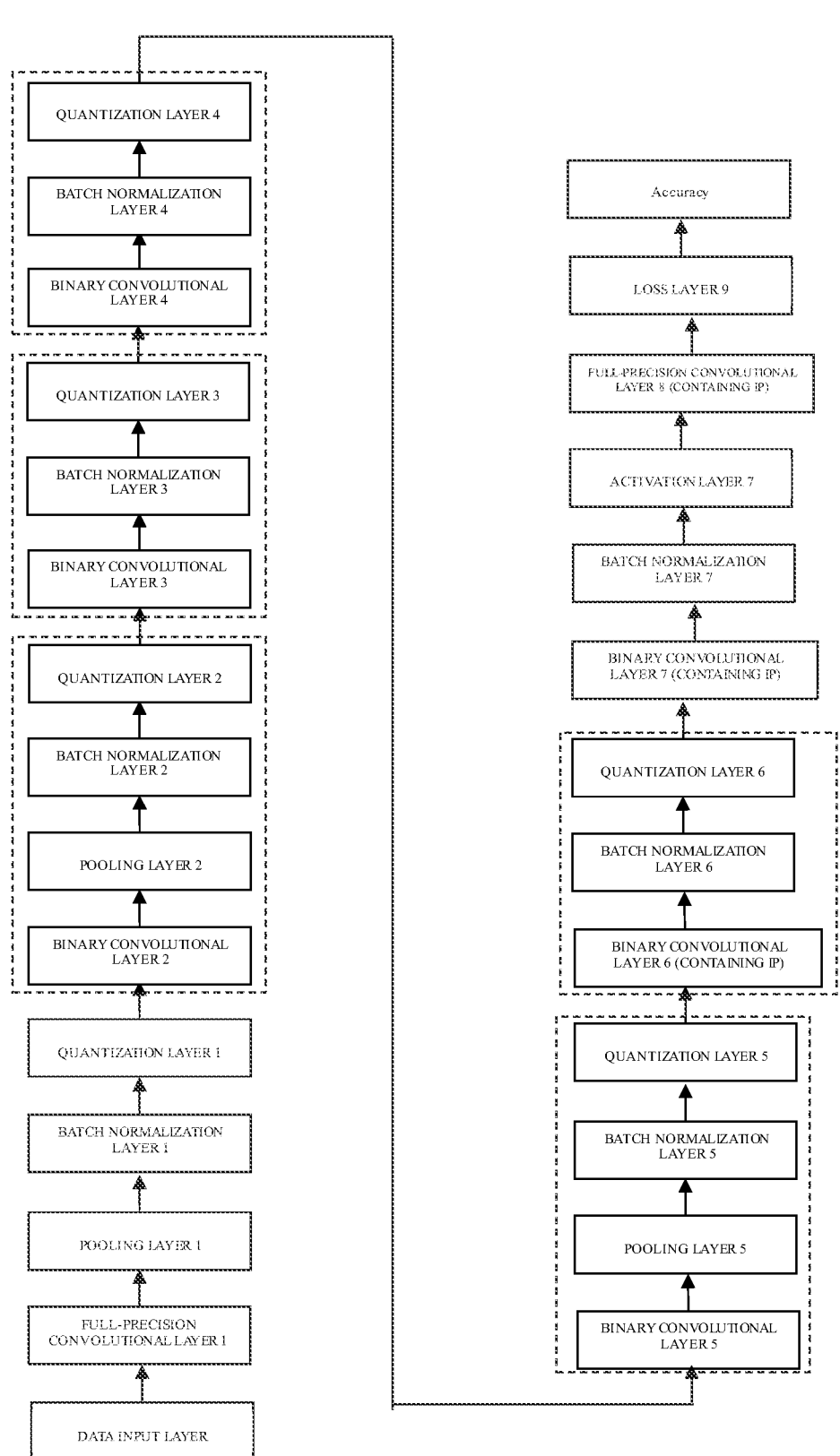
FIG. 10A shows an example of a network in which the multilayer neural network shown in FIG. 3 is divided into sub-structures.

Referring to FIG. 3, the binary quantized neural network contains eight convolutional layers. In order to ensure the accuracy of the neural network, the first and last convolutional layers can be set as full-precision convolutional layers (that is, convolutional layers that do not undergo a binarization processing), and the remaining convolutional layers are binary convolutional layers that have undergone a binarization processing. Assuming that the principle of the division of sub-structures is: the top layer is a binary convolutional layer, and the bottom layer is a quantization layer, and five sub-structures can be divided from the neural network shown in FIG. 3, and FIG. 3 with the sub-structures being divided becomes the structure shown in FIG. 10A, each dashed box in FIG. 10A represents a sub-structure. Here, the top layer of the first sub-structure is a binary convolutional layer 2, and there are a pooling layer 2 and a batch normalization layer 2 in sequence in the middle, and the bottom layer is a quantization layer 2; the top layer of the second sub-structure is a binary convolutional layer 3, and there is a batch normalization layer 3 in the middle, and the bottom layer is a quantization layer 3; the top layer of the third sub-structure is a binary convolutional layer 4, and there is a batch normalization layer 4 in the middle, and the bottom layer is a quantization layer 4; the top layer of the fourth sub-structure is a binary convolutional layer 5, and there are a pooling layer 5 and a batch normalization layer 5 in sequence in the middle, and the bottom layer is a quantization layer 5; and the top layer of the fifth sub-structure is a binary convolutional layer 6, and there is a batch normalization layer 6 in the middle, and the bottom layer is a quantization layer 6.

In order to simplify the description of the neural network, each layer of the multilayer neural network may be assigned with a different character identification according to Table 1.

TABLE 1

| Layer | Character Identification |
| --- | --- |
| Data Input Layer | D |
| Full-precision Convolutional Layer (containing IP) | F |
| Binary Convolutional Layer (containing IP) | C |
| Pooling Layer | P |
| Batch Normalization Layer | B |
| Quantization Layer | Q |
| Activation Layer (ReLU) | R |
| Loss Layer (SoftmaxWithLoss) | S |
| Accuracy | A |

Here, IP represents a fully connected layer, where each neuron connects to all input nodes. Based on the correspondence between the layers and the character identifications shown in Table 1, the neural network shown in FIG. 10A may be expressed as a character sequence as shown below.

D→F→P→B→Q→C→P→B→Q→C→B→
Q→C→B→Q→C→P→B→Q→C→B→Q→C→
B→R→F→S→A

Referring to the five divided sub-structures described above, it can be learned that the sub-sequence CPBQ and the sub-sequence CBQ in the character sequence represent the divided sub-structures. Therefore, by adopting a method such as a regular matching sub-string search, the five divided sub-structures may be expressed in the above character sequence as the following form.

D→F→P→B→Q→$\boxed{\text{C→P→B→Q}}$→$\boxed{\text{C→B→Q}}$→$\boxed{\text{C→B→Q}}$→
$\boxed{\text{C→P→B→Q}}$→$\boxed{\text{C→B→Q}}$→C→B→R→F→S→A In addition, since the neural network is operated layer by layer from top to bottom, in order to ensure the correct operation order of the neural network, there should be no nesting among the individual divided sub-structures. For example, when there is a sub-sequence such as C→C→B→Q→B→Q in the neural network, the sub-structures need to be divided in a manner (without nesting) as shown below, that is, the character sub-sequence C→B→Q in the middle is expressed as a sub-structure, and C and B→Q at both ends do not constitute sub-structures.

C→$\boxed{\text{C→B→Q}}$→B→Q

While if the sub-structures are divided in the following manner (with nesting), a problem that the operation is erroneous will occur.

C→$\boxed{\text{C→}\boxed{\text{B→Q}}}$→B→Q

In addition, as described above, it can be learned that since each of the divided sub-structures contains a quantization layer, each sub-structure contains quantization threshold parameters generated via the generation step S420 correspondingly.

Returning to FIG. 8, after sub-structures are divided from the multilayer neural network, in the data transferring step S432, for each divided sub-structure, the updating unit 230 transfers operation parameters for the layers other than the quantization layer to the quantization layer, and updates the generated quantization threshold parameters in the quantization layer in the sub-structure based on the transferred operation parameters. Specifically, in the data transferring step S432, for each layer other than the quantization layer of a sub-structure, operation parameters and operation procedure for the upper layer are equivalently transferred to the lower layer from top to bottom, until the operation parameters and the operation procedure for each layer are equivalently transferred to the quantization layer, so as to update the quantization threshold parameters in the quantization layer. For the updated quantization threshold parameters, they can reflect the operation parameters and the operation procedure for each layer (that is, the operation characteristic for each layer) undergone during data transferring, and when the updated quantization threshold parameters are used to perform a quantization (mapping) processing, integers may be used as the quantization result of the quantization (mapping) processing, thereby reducing the processor resources required during operation.

Figure 9B:
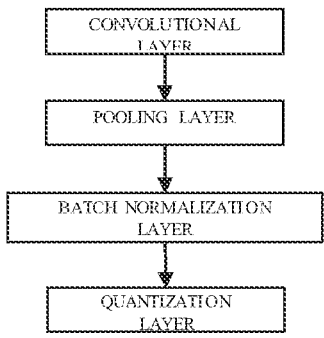
Figure 9C:
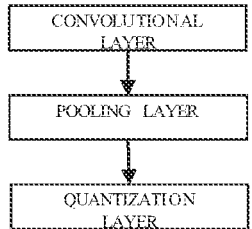
Figure 9D:
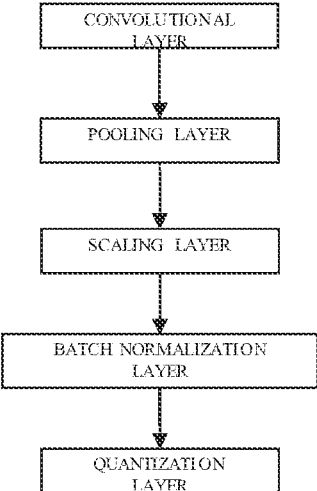

The following takes the sub-structure shown in FIG. 9A as an example to specifically describe the data transferring process in the data transferring step S432. The sub-structure shown in FIG. 9A includes a convolutional layer, a batch normalization layer, and a quantization layer from top to bottom. In the convolutional layer, after the input feature map input to the convolutional layer (that is, the output from the layer above the convolutional layer) $X_1$ is used to perform the operation shown in the above formula (2), the operation result $Y_1$ is output to the batch normalization layer. In the batch normalization layer, a batch normalization processing is performed on the received Y1, and the output after the batch normalization processing is equivalently transferred to the quantization layer. Then, in the quantization layer, the input feature map from the batch normalization layer is used to update each quantization threshold parameter in the above formulas (6) and (7). The sub-structures shown in FIGS. 9B to 9D can be regarded as variants of the sub-structure in FIG. 9A, and the transferring processes for them are similar to the above process. For example, compared with the sub-structure in FIG. 9A, the sub-structure shown in FIG. 9B has an extra pooling layer between the convolutional layer and the batch normalization layer, since the pooling operation itself does not require any parameters, the manner of the transferring of the operation result thereof is consistent with the manner based on the sub-structure of FIG. 9A. Compared with the sub-structure shown in FIG. 9A, the sub-structure shown in FIG. 9C cancels the batch normalization layer and adds a pooling layer. Since the pooling operation itself does not require any parameters, the operation result $Y_1$ for the convolutional layer is directly input into the quantization layer. Compared with the sub-structure shown in FIG. 9A, the sub-structure shown in FIG. 9D has a pooling layer and a scaling layer in sequence between the convolutional layer and the batch normalization layer, and then $Y_1$ output from the operation in the convolutional layer is transferred to the scaling layer through the pooling layer, after a scaling operation is performed using the input $Y_1$ in the scaling layer, the output result is transferred to the batch normalization layer, and finally the batch normalization layer uses the result output from the scaling layer for a batch normalization processing, and transfers the result after the batch normalization processing to the quantization layer.

In the following, the sub-structure shown in FIG. 9A is still taken as an example to illustrate the specific algorithm for transferring and updating quantization threshold parameters.

Convolutional layer: the operation shown in the above formula (2), that is, $Y_1=(W_b \otimes X)*\alpha + bias$, is performed on the input feature map X input to the convolutional layer.

Batch normalization layer: the output from the convolutional layer is transferred to the batch normalization layer for a batch normalization processing, and the procedure for the batch normalization processing can be expressed by the following formula (9):

$$Y_2 = \left(\frac{X_2 - \text{mean}}{\text{variance}}\right) * \text{scale} + \text{gamma}. \tag{9}$$

Here, mean is a mean parameter for the batch normalization layer, variance is a variance parameter for the batch normalization layer, scale is a scaling coefficient for the batch normalization layer, gamma is a bias parameter for the batch normalization layer, $X_2$ is the output (i.e., Y1) transferred from the convolutional layer to the batch normalization layer, and $Y_2$ is an output from the batch normalization layer. Here, mean and variance are numerical values of a floating-point type.

Quantization layer: the output from the batch normalization layer is transferred to the quantization layer for a quantization processing, so the input to the quantization layer can be expressed by the following formula (10):

$$X = \left(\frac{Y_1 - \text{mean}}{\text{variance}}\right) * \text{scale} + \text{gamma} = \tag{10}$$

$$\left(\frac{(W_b \otimes X)*\alpha + \text{bias} - \text{mean}}{\text{variance}}\right) * \text{scale} + \text{gamma}.$$

Taking the above formula (7) as an example, according to the above formula (10), the formula (7) can be evolved into the following formula (11):

$$Y(X) =$$

$$\begin{cases} 0, & \left(\frac{(W_b \otimes X)*\alpha + \text{bias} - \text{mean}}{\text{variance}}\right) * \text{scale} + \text{gamma} \leq thres1 \\ \beta, & thres1 < \left(\frac{(W_b \otimes X)*\alpha + \text{bias} - \text{mean}}{\text{variance}}\right) * \text{scale} + \text{gamma} \leq thres2 \\ 2\beta, & thres2 < \left(\frac{(W_b \otimes X)*\alpha + \text{bias} - \text{mean}}{\text{variance}}\right) * \text{scale} + \text{gamma} \leq thres3 \\ 3\beta, & \left(\frac{(W_b \otimes X)*\alpha + \text{bias} - \text{mean}}{\text{variance}}\right) * \text{scale} + \text{gamma} > thres3 \end{cases} \tag{11}$$

Through a mathematical transformation, the formula (11) can be evolved into the following formula (12):

$$Y(X) =$$

$$\begin{cases} 0, & \dfrac{\text{variance} * (thres1 - \text{gamma}) + \text{scale} * (\text{mean} - \text{bias})}{\alpha * \beta * \text{scale}} \le (W_b \otimes X) \\ 1, & \dfrac{\text{variance} * (thres1 - \text{gamma}) + \text{scale} * (\text{mean} - \text{bias})}{\alpha * \beta * sacle} < (W_b \otimes X) \le \dfrac{\text{variance} * (thres2 - \text{gamma}) + \text{scale} * (\text{mean} - \text{bias})}{\alpha * \beta * sacle} \\ 2, & \dfrac{\text{variance} * (thres2 - \text{gamma}) + \text{scale} * (\text{mean} - \text{bias})}{\alpha * \beta * sacle} < (W_b \otimes X) \le \dfrac{\text{variance} * (thres3 - \text{gamma}) + sscale * (\text{mean} - \text{bias})}{\alpha * \beta * sacle} \\ 3, & (W_b \otimes X) > \dfrac{\text{variance} * (thres3 - \text{gamma}) + \text{scale} * (\text{mean} - \text{bias})}{\alpha * \beta * sacle} \end{cases} \quad (12)$$

Via the above formula (12), the quantization threshold parameters (for example, thres1, thres2, and thres3) generated in the quantization layer via the generation step S420 can be updated as follows:

$$thres1' = \frac{\text{variance} * (thres1 - \text{gamma}) + \text{scale} * (\text{mean} - \text{bias})}{\alpha * \beta * \text{sale}}$$

$$thres2' = \frac{\text{variance} * (thres2 - \text{gamma}) + \text{scale} * (\text{mean} - \text{bias})}{\alpha * \beta * \text{sale}}$$

$$thres3' = \frac{\text{variance} * (thres3 - \text{gamma}) + \text{scale} * (\text{mean} - \text{bias})}{\alpha * \beta * \text{sale}}.$$

Thus, the above formula (12) can be evolved into the following formula (13):

$$Y(X) = \begin{cases} 0, & X \le thres1' \\ 1, & thres1' < X \le thres2' \\ 2, & thres2' < X \le thres3' \\ 3, & X > thres3' \end{cases} \quad (13)$$

In addition, in order to make the structure of the multi-layer neural network simpler, after updating the quantization threshold parameters in the quantization layer in each sub-structure, the updating unit 230 can also perform a simplification processing on the sub-structures, that is, for each sub-structure, the layers for which the operation parameters have been completely transferred to the quantization layer are removed from the sub-structure. Since among the layers other than the quantization layer, there are layers for which the operation parameters and the operation procedures have been completely and equivalently transferred to the quantization layer, such layers no longer perform operations on the data when the multilayer neural network is operated, and therefore the operation accuracy will not be negatively affected even if such layers are removed.

Taking the sub-structure shown in FIG. 9A as an example, after the operation parameters and the operation procedures in the convolutional layer and the batch normalization layer are equivalently transferred to the quantization layer, on one hand, since the operation parameters and the operation procedure for the batch normalization layer have been equivalently and completely transferred to the quantization layer, the batch normalization layer can be removed from the sub-structure. On the other hand, although the scaling and bias parameters for the convolution filter for the convolutional layer are also transferred to the quantization layer, the convolutional layer still has to perform the $(W_b \otimes X)$ operation that is irrelevant to the scaling and bias parameters for the convolution filter, and therefore the convolutional layer cannot be removed. After the above processing for simpli-fying the sub-structures, the structure of the multilayer neural network can be greatly simplified. Based on the above simplification principle, the neural network shown in FIG. 10A can be changed to the simplified structure shown in FIG. 10B, where the quantization layers in the sub-structures become joint quantization layers. Note that here the sub-structure shown in FIG. 9A is taken as an example for illustration, the embodiment of the present disclosure does not make a limitation for a specific sub-structure, as long as operation parameters and operation procedure for a layer in the sub-structure are completely transferred to the quantization layer, this layer can be removed from the sub-structure.

Returning to FIG. 8, after the updating of the quantization threshold parameters in the quantization layer in each sub-structure is completed, in the fixed-point step S433, the updating unit 230 performs a fixed-point processing on each layer in the multilayer neural network, thereby converting floating-point operation parameters to fixed-point parameters. An optional fixed-point processing technology is the Q-value technology, wherein the Q-value is a positive integer N, which means that a floating-point number is left shifted by N bits (an amplification operation, equivalent to multiplying by the Nth power of 2) and then rounded, thus the floating-point operation parameter is converted to a fixed-point parameter (integer). Depending on the accuracy requirements for the multilayer neural network, either one N value can be set for the entire multilayer neural network, or N values can be set for different layers respectively. The following takes setting a Q-value respectively for each layer of the neural network which has undergone a simplification processing shown in FIG. 10B as an example to specifically illustrate the fixed-point process.

Figure 10B:
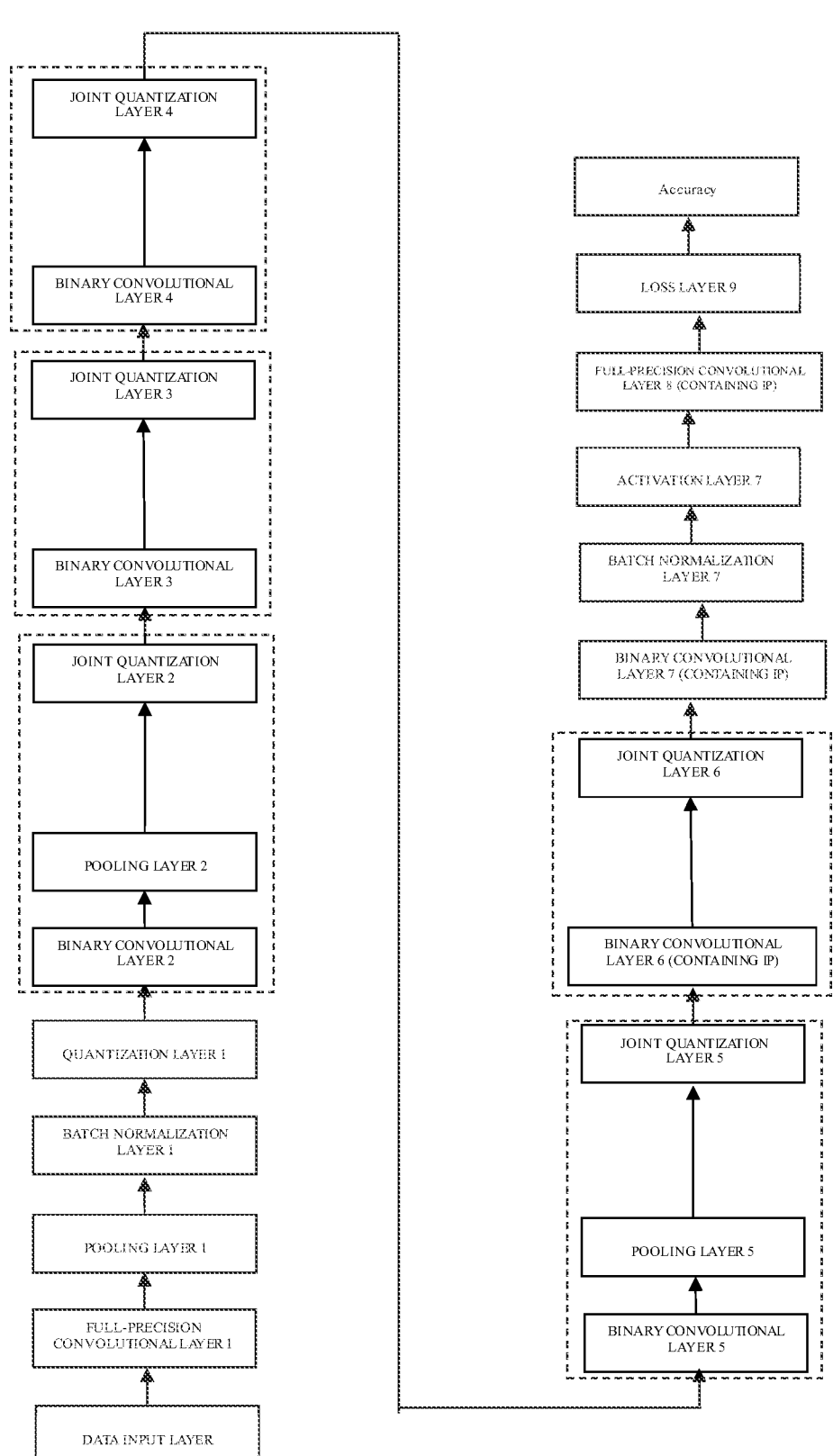
FIG. 10B shows an example of the network of FIG. 10A after being simplified.

Since the five sub-structures in the neural network shown in FIG. 10B have undergone the joint quantization processing and the sub-structure simplification processing based on data transferring in the data transferring step S432, and the operation parameters in the binary convolutional layer 2 to the binary convolutional layer 7 in the neural network are integers, the Q-values for the binary convolutional layer 2 to the binary convolutional layer 7 can be 1; since the operation parameters in other layers are still floating-point numbers, the Q-values for the full-precision convolutional layer 1 and the quantization layer 1 are 9, and the Q-value for the full-precision convolutional layer 8 is 13, so that the operation parameters for each layer in the neural network shown in FIG. 10B are converted into fixed-point parameters. Table 2 is a Q-value table designed for the neural network shown in FIG. 10B.

TABLE 2

| Layer | Q-value |
|---|---|
| Full-precision Convolutional Layer 1 | 9 |
| Quantization Layer 1 | 9 |
| Binary Convolutional Layer 2 | 1 |
| Joint Quantization Layer 2 | 1 |
| Binary Convolutional Layer 3 | 1 |
| Joint Quantization Layer 3 | 1 |
| Binary Convolutional Layer 4 | 1 |
| Joint Quantization Layer 4 | 1 |
| Binary Convolutional Layer 5 | 1 |
| Joint Quantization Layer 5 | 1 |
| Binary Convolutional Layer 6 (containing IP) | 1 |
| Joint Quantization Layer 6 | 1 |
| Binary Convolutional Layer 7 (containing IP) | 1 |
| Full-precision Convolutional Layer 8 (containing IP) | 13 |

Returning to FIG. 4, after the updating of the multilayer neural network is completed, further, in the storing step S440, the storage unit 240 may store the fixed-point neural network obtained by the updating unit 230, so that the fixed-point neural network can be used for a subsequent specific task processing such as a human face detection, etc.

As described above, in the present disclosure, since the quantization threshold parameters in each quantization layer are generated based on the number of quantization bits and the learnable quantization interval parameter, the quantization threshold parameters in each quantization layer are not predefined, in other words, the quantization threshold parameters generated according to the present disclosure are learnable, and therefore each quantization layer has no restriction on the distribution of the input data. As a result, the overall performance (for example, accuracy) of the multilayer neural network obtained according to the present disclosure will be improved. Furthermore, in the present disclosure, when the quantization operation is performed on the data to be quantized, a simple numerical comparison operation can be performed according to the generated quantization threshold parameters, thereby the overall calculation cost of the multilayer neural network can be reduced.

(Method for Applying Multilayer Neural Network)

Figure 11:
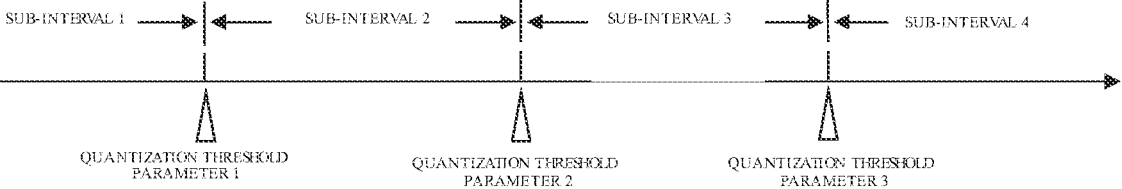
FIG. 11 schematically shows an example of a numerical space divided by quantization threshold parameters.

After a multilayer neural network is generated, the generated multilayer neural network can be applied to a specific task processing such as a human face detection, etc. For example, as described above, the present disclosure provides a method for applying a multilayer neural network, the method comprises: a saving step of saving a loaded multilayer neural network; an inputting step of inputting a data set corresponding to requirements for a task that the saved multilayer neural network can perform to the saved multilayer neural network; and an operating step of performing a convolution operation and a quantization operation on the data set in the multilayer neural network from top to bottom and outputting a result. Here, the convolution operation is performed based on the input data set or the quantized feature map and multi-bit weights, and the quantization operation quantizes the feature map output by the convolution operation into fixed-point integers expressed by multiple bits. Here, the quantization operation involved in the operating step comprises:

1) Based on the quantization threshold parameters in the quantization layer in the multilayer neural network, dividing a numerical space into individual sub-intervals, wherein each sub-interval corresponds to a quantized output value. Here, the numerical space represents a set of real value data input to each layer of the multilayer neural network. Taking the quantization bit parameter k=2 as an example, as described above, it can be learned that in a case of k=2, according to the present disclosure, three quantization threshold parameters (the quantization threshold parameter 1, the quantization threshold parameter 2, and the quantization threshold parameter 3 as shown in FIG. 11) can be generated, so that the three quantization threshold parameters can divide the numerical space into four sub-intervals (the sub-interval 1, the sub-interval 2, the sub-interval 3, and the sub-interval 4 as shown in FIG. 11). Here, the quantization threshold parameter 1, the quantization threshold parameter 2, and the quantization threshold parameter 3 shown in FIG. 11 correspond to thres1', thres2', and thres3' in the above formula (13) respectively, for example.

2) Determining the sub-interval to which the result of the convolution operation belongs, and outputting the quantized output value corresponding to the sub-interval. For example, assuming that the result of the convolution operation belongs to the sub-interval 3 shown in FIG. 11, it can be learned from the above formula (13) that the output quantized output value is 2, for example.

All the units described above are exemplary and/or preferred modules for implementing the processing in the disclosure. These units may be hardware units (such as field programmable gate arrays (FPGA), digital signal processors, application specific integrated circuits, etc.) and/or software modules (such as computer readable programs). The units used to implement each step are not described in detail above. However, when there are steps for executing a specific process, there can be corresponding functional modules or units (implemented by hardware and/or software) for implementing the same process. The technical solutions through all combinations of the described steps and units corresponding to these steps are included in the disclosure of this application, as long as the technical solutions that they constitute are complete and applicable.

The method and the apparatus in the present disclosure can be embodied in a variety of ways. For example, the method and the apparatus of the present disclosure can be embodied by software, hardware, firmware or any combination thereof. Unless specifically stated otherwise, the above order of the steps of the present method is only intended to be illustrative, and the steps of the method of the present disclosure are not limited to the order specifically described above. In addition, in some embodiments, the present disclosure may also be embodied as a program recorded in a recording medium, which includes machine-readable instructions for implementing the method according to the present disclosure. Therefore, the present disclosure also covers a recording medium storing a program for implementing the method according to the present disclosure.

Although some specific embodiments of the present disclosure have been presented by examples in detail, those skilled in the art should understand that the above examples are only intended to be illustrative and do not limit the scope of the present disclosure. Those skilled in the art understand that the above embodiments can be modified without departing from the scope and spirit of the present disclosure. The scope of the present disclosure is restricted by the appended claims

What is claimed is:

1. A method for generating a multilayer neural network comprising:

acquiring a first multilayer neural network used for face detection, wherein the first multilayer neural network includes at least convolutional layers and quantization layers;

calculating, for each of the quantization layers in the first multilayer neural network, quantization threshold parameters based on a quantization bit parameter indicating a bit width used to quantize a data and a learned quantization interval parameter in the quantization layer in the first multilayer neural network by dividing a quantization interval indicated by the quantization interval parameter into equally spaced sub-intervals to determine quantization centers, and computing the quantization threshold parameters from averages of the determined quantization centers that are adjacent quantization centers, wherein, when a lower bound of the quantization interval equals zero, setting one of the quantization threshold parameters to zero, and calculating the remaining quantization threshold parameters from the averages of the adjacent quantization centers excluding zero center;

dividing at least one sub-structure from the first multilayer neural network, wherein bottom layers of the divided sub-structures are quantization layers;

transferring, for each of the divided sub-structures, the operation parameters for layers other than the quantization layer to the quantization layer, and updating the generated quantization threshold parameters in the quantization layer based on the transferred operation parameters;

performing a fixed-point processing on each layer in the first multilayer neural network, thereby converting floating-point operation parameters into fixed-point parameters; and generating a fixed-point multilayer neural network based on the calculated quantization threshold parameters and the operation parameters for each layer in the first multilayer neural network.

2. The method according to claim 1, wherein the generating of the quantization threshold parameters comprises:

determining a quantization step size based on the quantization bit parameter and the learnable quantization interval parameter;

determining quantization centers based on the learnable quantization interval parameter and the determined quantization step size; and determining the quantization threshold parameters based on the determined quantization centers;

wherein the quantization bit parameter is determined based on the number of bits required to quantize a feature map.

3. The method according to claim 2, wherein the quantization step size is a quotient between a length indicated by the learnable quantization interval parameter and the number of different output states indicated by the quantization bit parameter.

4. The method according to claim 2, wherein the quantization centers are endpoint values of individual sub-intervals, wherein the sub-intervals are obtained by dividing an interval indicated by the learnable quantization interval parameter based on the quantization step size.

5. The method according to claim 2, wherein the quantization threshold parameters are composed of values each of which is an average value of values of two adjacent quantization centers, or are composed of a value of the first quantization center and values each of which is an average value of values of two adjacent quantization centers among remaining quantization centers.

6. The method according to claim 1, wherein the divided sub-structures include convolutional layers.

7. The method according to claim 6, wherein in the transferring, the generated quantization threshold parameters in the quantization layer are updated based on a normalization coefficient transferred to the quantization layer.

8. The method according to claim 6, wherein in the transferring, the generated quantization threshold parameters in the quantization layer are updated based on a scale coefficient transferred from the convolutional layer to the quantization layer.

9. The method according to claim 1, wherein the updated quantization threshold parameters are expressed by a base coefficient, a normalization coefficient, and association relationships between the generated quantization threshold parameters with respect to the base coefficient.

10. The method according to claim 1, wherein the updating of the generated quantization threshold parameters further comprises:

removing layers for which the operation parameters have been completely transferred to the quantization layers from the sub-structures.

11. An apparatus for generating a multilayer neural network comprising:

at least one memory and at least one processor which function as:

an acquisition unit configured to acquire a first multilayer neural network used for face detection, wherein the first multilayer neural network includes at least convolutional layers and quantization layers;

a calculation unit configured to, for each of the quantization layers in the first multilayer neural network, generate quantization threshold parameters based on a quantization bit parameter indicating a bit width used to quantize a data and a learned quantization interval parameter in the quantization layer in the first multilayer neural network by dividing a quantization interval indicated by the quantization interval parameter into equally spaced sub-intervals to determine quantization centers, and computing the quantization threshold parameters from averages of the determined quantization centers that are adjacent quantization centers, wherein, when a lower bound of the quantization interval equals zero, setting one of the quantization threshold parameters to zero, and calculating the remaining quantization threshold parameters from the averages of the adjacent quantization centers excluding zero center;

a dividing unit configured to divide at least one substructure from the multilayer neural network, wherein bottom layers of the divided sub-structures are quantization layers;

a transferring unit configured to transfer for each of the divided sub-structures, the operation parameters for layers other than the quantization layer to the quantization layer, and updating the generated quantization threshold parameters in the quantization layer based on the transferred operation parameters;

a performing unit configured to perform a fixed-point processing on each layer in the multilayer neural network, thereby converting floating-point operation parameters into fixed-point parameters; and a generating unit configured to generate a fixed-point multilayer neural network based on the calculated quantization threshold parameters and the operation parameters for each layer in the first multilayer neural network.

12. A method for applying a multilayer neural network comprising:

saving a loaded multilayer neural network;

inputting a data set corresponding to requirements for a task that the saved multilayer neural network can perform to the saved multilayer neural network; and performing a convolution operation and a quantization operation on the data set in the multilayer neural network from top to bottom and outputting a result, wherein the loaded multilayer neural network is generated by:

acquiring a first multilayer neural network used for face detection, wherein the first multilayer neural network includes at least convolutional layers and quantization layers;

calculating, for each of the quantization layers in the first multilayer neural network, quantization threshold parameters based on a quantization bit parameter indicating a bit width used to quantize a data and a learned quantization interval parameter in the quantization layer in the first multilayer neural network by dividing a quantization interval indicated by the quantization interval parameter into equally spaced sub-intervals to determine quantization centers, and computing the quantization threshold parameters from averages of the determined quantization centers that are adjacent quantization centers, wherein, when a lower bound of the quantization interval equals zero, setting one of the quantization threshold parameters to zero, and calculating the remaining quantization threshold parameters from the averages of the adjacent quantization centers excluding zero center;

dividing at least one sub-structure from the first multilayer neural network, wherein bottom layers of the divided sub-structures are quantization layers;

transferring, for each of the divided sub-structures, the operation parameters for layers other than the quantization layer to the quantization layer, and updating the generated quantization threshold parameters in the quantization layer based on the transferred operation parameters;

performing a fixed-point processing on each layer in the multilayer neural network, thereby converting floating-point operation parameters into fixed-point parameters; and generating a fixed-point multilayer neural network based on the calculated quantization threshold parameters and the operation parameters for each layer in the first multilayer neural network.

13. The method according to claim 12, wherein the quantization operation comprises:

dividing a numerical space into individual sub-intervals based on quantization threshold parameters in a quantization layer in the multilayer neural network, wherein each sub-interval corresponds to a quantized output value; and determining the sub-interval to which a result of the convolution operation belongs, and outputting the quantized output value corresponding to the sub-interval.

14. An apparatus for generating a multilayer neural network comprising:

at least one memory and at least one processor which function as:

a saving unit configured to save a loaded multilayer neural network;

an input unit configured to input a data set corresponding to requirements for a task that the saved multilayer neural network can perform to the saved multilayer neural network; and an operation unit configured to perform a convolution operation and a quantization operation on the data set in the multilayer neural network from top to bottom and outputting a result, wherein the loaded multilayer neural network is generated by:

an acquiring unit configured to acquire a first multilayer neural network used for face detection, wherein the first multilayer neural network includes at least convolutional layers and quantization layers;

a calculating unit configured to calculate, for each of the quantization layers in the first multilayer neural network, quantization threshold parameters based on a quantization bit parameter indicating a bit width used to quantize a data and a learned quantization interval parameter in the quantization layer in the first multilayer neural network by dividing a quantization interval indicated by the quantization interval parameter into equally spaced sub-intervals to determine quantization centers, and computing the quantization threshold parameters from averages of the determined quantization centers that are adjacent quantization centers, wherein, when a lower bound of the quantization interval equals zero, setting one of the quantization threshold parameters to zero, and calculating the remaining quantization threshold parameters from the averages of the adjacent quantization centers excluding zero center;

a dividing unit configured to divide at least one sub-structure from the first multilayer neural network, wherein bottom layers of the divided sub-structures are quantization layers;

a transferring unit configured to transfer for each of the divided sub-structures, the operation parameters for layers other than the quantization layer to the quantization layer, and updating the generated quantization threshold parameters in the quantization layer based on the transferred operation parameters;

a performing unit configured to perform a fixed-point processing on each layer in the multilayer neural network, thereby converting floating-point operation parameters into fixed-point parameters; and a generating unit configured to generate a fixed-point multilayer neural network based on the calculated quantization threshold parameters and the operation parameters for each layer in the first multilayer neural network.

15. A non-transitory computer-readable storage medium for storing instructions, which when executed by a processor, enable to generate a multilayer neural network, the instructions comprise:

an acquisition step of acquiring a first multilayer neural network used for face detection, wherein the first multilayer neural network includes at least convolutional layers and quantization layers;

a calculation step of, for each of the quantization layers in the first multilayer neural network, generating quantization threshold parameters based on a quantization bit parameter indicating a bit width used to quantize a data and a learned quantization interval parameter in the quantization layer in the first multilayer neural network by dividing a quantization interval indicated by the quantization interval parameter into equally spaced sub-intervals to determine quantization centers, and computing the quantization threshold parameters from averages of the determined quantization centers that are adjacent quantization centers, wherein, when a lower bound of the quantization interval equals zero, setting one of the quantization threshold parameters to zero, and calculating the remaining quantization threshold parameters from the averages of the adjacent quantization centers excluding zero center;

a dividing step of dividing at least one sub-structure from the first multilayer neural network, wherein bottom layers of the divided sub-structures are quantization layers;

a transferring step of transferring for each of the divided sub-structures, the operation parameters for layers other than the quantization layer to the quantization layer, and updating the generated quantization threshold parameters in the quantization layer based on the transferred operation parameters;

a performing step of performing a fixed-point processing on each layer in the multilayer neural network, thereby converting floating-point operation parameters into fixed-point parameters; and a generating step of generating a fixed-point multilayer neural network based on the calculated quantization threshold parameters and the operation parameters for each layer in the first multilayer neural network.

16. A non-transitory computer-readable storage medium for storing instructions, which when executed by a processor, enable to apply a multilayer neural network, the instructions comprise:

a saving step of saving a multilayer neural network;

an inputting step of inputting a data set corresponding to requirements for a task that the saved multilayer neural network can perform to the saved multilayer neural network; and an operating step of performing a convolution operation and a quantization operation on the data set in the multilayer neural network from top to bottom and output a result, wherein the loaded multilayer neural network is generated by a method comprising:

acquiring a first multilayer neural network used for face detection, wherein the first multilayer neural network includes at least convolutional layers and quantization layers;

calculating, for each of the quantization layers in the first multilayer neural network, quantization threshold parameters based on a quantization bit parameter indicating a bit width used to quantize a data and a learned quantization interval parameter in the quantization layer in the first multilayer neural network by dividing a quantization interval indicated by the quantization interval parameter into equally spaced sub-intervals to determine quantization centers, and computing the quantization threshold parameters from averages of the determined quantization centers that are adjacent quantization centers, wherein, when a lower bound of the quantization interval equals zero, setting one of the quantization threshold parameters to zero, and calculating the remaining quantization threshold parameters from the averages of the adjacent quantization centers excluding zero center;

dividing at least one sub-structure from the first multilayer neural network, wherein bottom layers of the divided sub-structures are quantization layers;

transferring, for each of the divided sub-structures, the operation parameters for layers other than the quantization layer to the quantization layer, and updating the generated quantization threshold parameters in the quantization layer based on the transferred operation parameters;

performing a fixed-point processing on each layer in the multilayer neural network, thereby converting floating-point operation parameters into fixed-point parameters; and generating a fixed-point multilayer neural network based on the calculated quantization threshold parameters and the operation parameters for each layer in the first multilayer neural network.

* * * * *